US006253634B1

(12) United States Patent
Nakagome

(10) Patent No.: US 6,253,634 B1
(45) Date of Patent: Jul. 3, 2001

(54) VEHICULAR OPENER DEVICE HAVING A RECESSED OPERATION LEVER

(75) Inventor: Katsumi Nakagome, Kanagawa (JP)

(73) Assignee: Ohi Seisakusho Co., LTD, Yokohama (JP)

(*) Notice: Subject to any disclaimer, the term of this patent is extended or adjusted under 35 U.S.C. 154(b) by 0 days.

(21) Appl. No.: 09/176,795

(22) Filed: Oct. 22, 1998

(30) Foreign Application Priority Data

Oct. 23, 1997 (JP) .................................................. 9-291163

(51) Int. Cl.[7] .............................. B60R 27/00; F16F 1/12; G05G 1/00

(52) U.S. Cl. ............................ 74/491; 74/501.6; 74/523; 70/256; 267/179; 292/225; 292/336.3; 292/DIG. 25

(58) Field of Search ................................... 74/491, 501.6, 74/502, 523; 292/336.3, 125, 50, 225, DIG. 25; 403/325; 185/45; 267/228, 273, 173, 179; 70/256

(56) References Cited

U.S. PATENT DOCUMENTS 2,452,208 * 10/1948 Reger .................................. 267/173
4,032,129 * 6/1977 Larsson ............................... 267/179
4,476,354 * 10/1984 Uchino et al. ....................... 379/445
4,917,424 4/1990 Ishihara et al. .
4,958,536 * 9/1990 Baumgarten ........................ 74/501.6
5,535,608 7/1996 Brin .
5,551,793 * 9/1996 Lewis ................................. 403/325

FOREIGN PATENT DOCUMENTS

936721 * 9/1963 (GB) .................................. 267/179

* cited by examiner

*Primary Examiner*—David A. Bucci
*Assistant Examiner*—William C Joyce
(74) *Attorney, Agent, or Firm*—Foley & Lardner

(57) ABSTRACT

An opener device having an operation lever rotatably supported so as to open a lid member through a remote operation, and a spring hooked at one end to spring hooking member of the operation lever so as to elastically urge the operation lever, and hooked at the other end to a fixing member. The opener device is improved such that the spring hooking member includes: a recess located at the base end of the operation lever; and a hook-receiving portion provided in the recess, while being located in an internal position of the thickness direction of the operation lever.

9 Claims, 5 Drawing Sheets

VEHICULAR OPENER DEVICE HAVING A RECESSED OPERATION LEVER

BACKGROUND OF THE INVENTION

1. Field of the Invention

The present invention relates to a vehicular opener device, and more particularly to an opener device for opening a lid of a vehicle by a remote operation.

2. Description of the Related Art

Generally, in a motor vehicle, operation levers coupled to a fuel lid and a trunk lid, which are located on the rear side of the vehicle, are located near and under a driver's seat. The driver operates the operation levers to remotely open those lids.

An example of the conventional opener device of this type is disclosed in Japanese Utility Model Publication No. Hei. 7-20293. The disclosed opener device 22 includes levers 17, 18, and a spring 19 and L-shaped pawl portions 20, 21 as shown in FIGS. 6 and 7. The levers 17, 18 are rotatably held by a base 16 secured to the vehicle body. The spring 19 includes circular hooking portions 19*a*, 19*b* integrally formed at both ends thereof, and constantly urges the lever 17 to an initial position (a spring for another lever 18 being not shown). The pawl portions 20 and 21 are integrally formed with the base 16 and and the lever 17. The bending portions 20*a* of the pawl portion 20 is slightly rounded. The diagonal length from the bending portion 20*a* to the tip 20*b* is larger than the diameter of each of hooking portions 19*a*, 19*b*. The hooking portions 19*a*, 19*b* are fastened to the pawl portions 20, 21, and the spring 19 is disposed between the pawl portions 20, 21.

In the spring hooking structure provided within the cross member of the vehicle body, the hooking portion of the spring is hooked to the spring receiving portion protruding outward from the surface 17*a* of the operation lever, And the coiled portion of the spring is disposed at a location separated from the surface of the operation lever.

In the conventional opener device, the spring hooking portion to which the spring is hooked protrudes outward from the surface of the operation lever, occupies a large area and is obstructive. The coiled portion of the spring is located apart from the surface of the operation lever. Therefore, the opener device, which is inserted into and placed within the cross member, is large, and the opening of the cross member is large. And the cross member as a reinforcing member is reduced in its strength. As a consequence, the vehicle body is reduced in rigidity and strength.

SUMMARY OF THE INVENTION

To remove the above disadvantages, an opener device of the present invention is constructed such that a hook-receiving portion of an operation lever to which the hook portion of a spring is hooked is buried in the operation lever to as to not to be obstructive.

To achieve the above object there is provided an opener device for opening a lid member of a vehicle body through a pulling member by a remote operation, comprising: an operation lever rotatably supported by a part of the vehicle body; a spring having a coiled portion and first and second hook portions disposed at both ends of the coiled portion; and means for hooking the spring, being disposed at one end of the operation lever, wherein the first hook portion of the spring in hooked to the hooking means and the second hook portion of the spring is hooked to a part of the vehicle body, whereby the spring elastically urges the operation lever, and the hooking means comprising: a recess located at the one end of the operation lever; and a hook-receiving portion being provided in the recess, the hook-receiving portion being located at an internal position in a thickness direction of the operation lever so that the hook-receiving portion does not protrude from a surface of the operation lever, wherein the first hook portion of the spring is hooked to the hook-receiving portion while being disposed in the recess, so that the coiled portion of the spring is continuously disposed along a thickness of the operation lever.

Preferably, in the above opener device, the hook-receiving portion of the hooking means is smaller than an inner diameter of the first hook portion of the spring, and the recess is larger than an outer diameter of the first hook portion.

Further, the hook-receiving portion can be constituted by a protrusion protruded from a bottom portion or the recess and having an L-shaped side view.

Still further, two recesses can be formed on both sides of the one and of the operation recess, and the hook-receiving portion can be constituted by a through hole formed through bottom portions of the two recesses.

Thus, in the opener device, the spring hooking member comprises the recess located at the base end of the operation lever, and the hook-receiving portion is provided in the recess, which is located at an internal position in the thickness direction of the operation lever. In other words, the hook-receiving portion of the spring hooking member is buried in the operation lever. Therefore, the hook portion of the spring is hooked to the spring hooking member without protruding upward from the surface of the operation lever. The coiled portion of the spring is continuously disposed along the thickness of the operation lever. In other words, the coiled portion of the spring is located at a position so as to be substantially overlapped with the operation lever in the width direction of the thickness at the base end of the operation lever. With such a construction, there is no chance that the spring is unintentionally slipped off from the operation lever, and hence the spring is firmly hooked to the operation lever. Further, the operation lever is reduced in thickness, and may easily be manufactured by molding proceed. Therefore, the opener device is reduced in size as a whole, and the spring after assembled never be slipped off from the operation lever.

DETAILED DESCRIPTION OF THE PREFERRED EMBODIMENTS

Details of the present invention will be apparent from the following description and the accompanying drawings.

Figure 1:
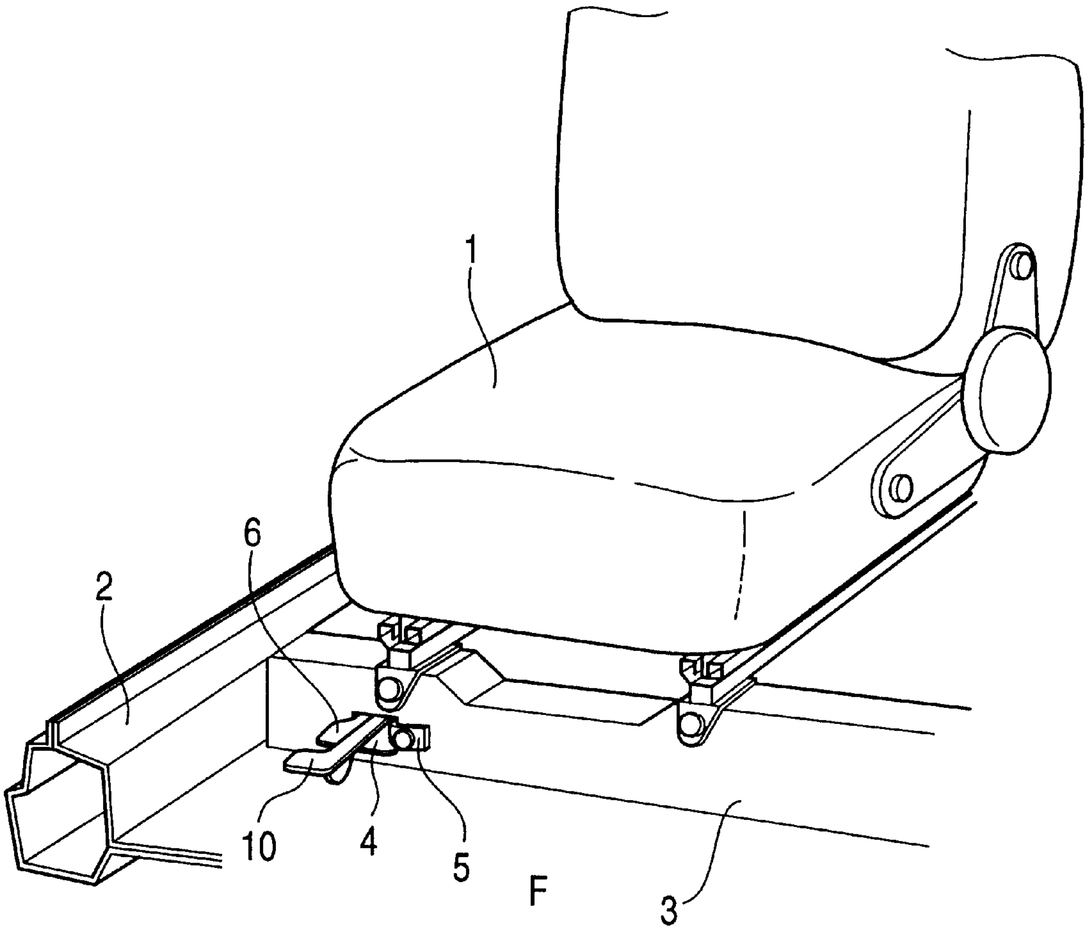
FIG. 1 is a perspective view showing a vehicular seat portion provided with an opener device for trunk lid which is constructed according to the present invention.

FIGS. 1 through 4 show a vehicular opener device, which is a preferred embodiment of the present invention. FIG. 1 shows a vehicular seat portion provided with the opener device.

In the figures, reference numeral 1 designates a seat; 2 is a side sill: 3 is a cross member; 4 is an opening of the cross member 3; 5 is a base member; 6 is a fuel-lid operation lever for an opener device; 7 is a shaft; 8 is a pulling member; 9 is a guide member; 10 is a trunk operation lever; 10*a* is a distal end of the trunk operation lever 10; 10*c* is a coupling portion: 10*d* is a spring hooking member; 11 is a spring; 11*a* is a hook portion; 11*b* is a coiled portion of the spring 11; 12 is a hook-receiving portion; 13 is a recess; and 14 is a cutout. Character F is a floor. The illustrated opener device is provided for a trunk lid. In the trunk opener device, the side sill 2 is disposed under the seat 1. The cross member 3 is secured to the side sill 2 while being oriented substantially perpendicular to the side sill 2. The base member 5 is mounted on the cross member 3. The fuel-lid operation lever 6 and the trunk operation lever 10, while being disposed adjacent to each other, are coupled into the base member 5 in a rotatable fashion. Further, the spring 11 is further coupled to the base member 5. The spring 11 elastically urges the trunk operation lever 10 to a normal position.

Figure 2:
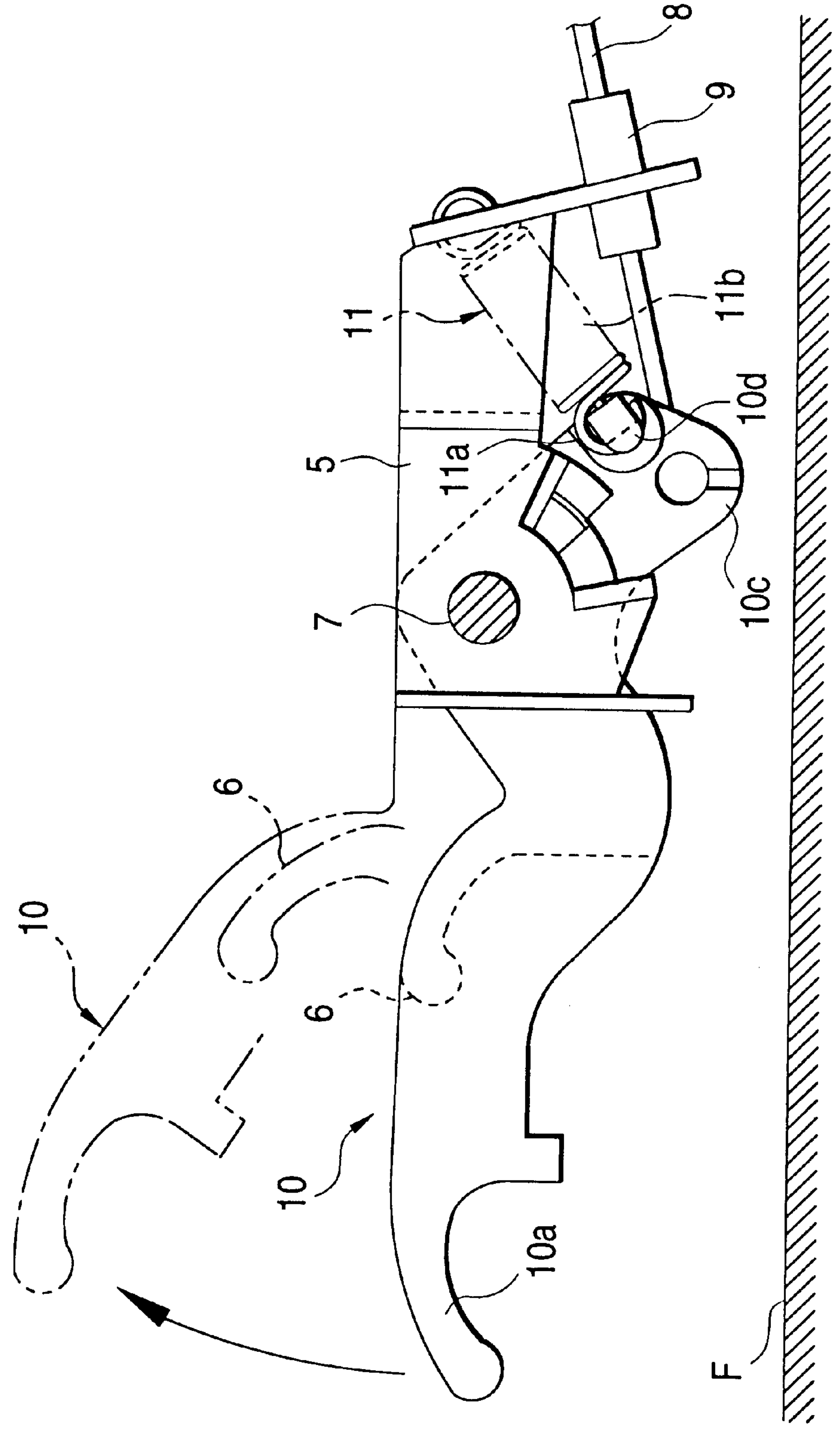
FIG. 2 is a side view showing an operation lever of the opener device shown in FIG. 1, the lever being in a normal state.

In the trunk opener device of the invention, the trunk operation lever 10, while being disposed adjacent to the fuel-lid operation lever 6, is rotatably supported on the proper shaft 7 or pivotally supported by a related support mechanism, the shaft or support mechanism being provided on the base member 5, which is secured to the cross member 3 of the vehicle body. The trunk operation lever 10 is coupled with one end of the pulling member 8, e.g., a rod or a wire, for opening the trunk lid. Further, the spring 11 is hooked at one end to the trunk operation lever 10, while pulling the trunk operation lever 10. The pulling member 8 (e.g., rod or wire) is guided by the guide member 9 in a state that it is reciprocatively movable therein. The trunk operation lever 10 and the fuel-lid operation lever 6 adjacent to the former are both extended forward or outward through the opening 4 of the cross member 3 of the vehicle body, while being sufficiently spaced from the floor F. To operate the trunk operation lever 10, it is pulled upward. As shown in FIG. 2, when the distal end 10*a* of the trunk operation lever 10 is pulled upward with the hand, the trunk operation lever 10 is turned clockwise about the shaft 7 and the pulling member 8 (e.g., a rod or wire) is pulled to open the trunk lid.

The trunk operation lever 10 is long and narrow as shown. The trunk operation lever 10 is rotatably supported, by the shaft 7, at its point slightly close to its rear end with respect to its center. The distal end 10*a* of the trunk operation lever 10 serves as a handle. The rear end of the trunk operation lever 10 includes the coupling portion 10*c* for the pulling member 8 (e.g., a rod or wire) for the trunk rid, and the spring hooking member 10*d* for the spring 11 already mentioned.

Figure 4:
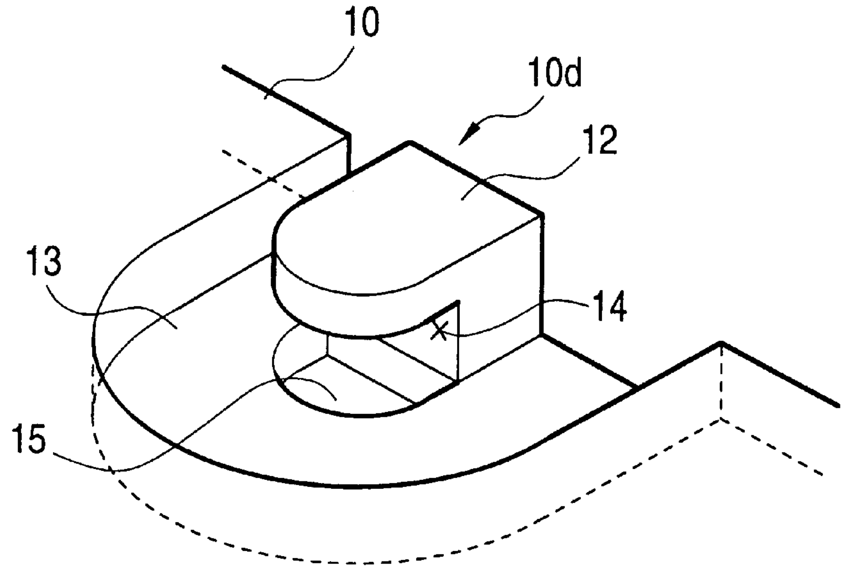
FIG. 4 is an exploded, perspective view showing a spring hooking member used in the FIG. 1 opener device.
Figure 5:
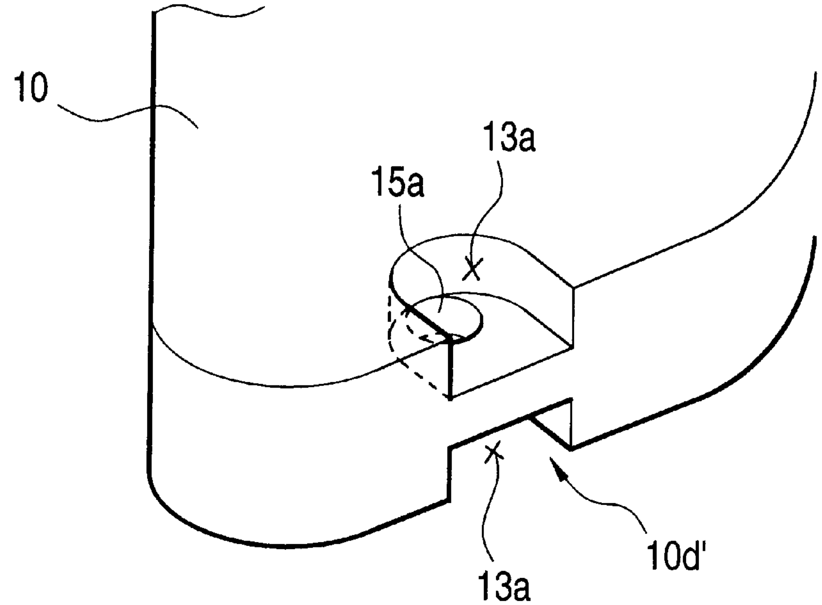
FIG. 5 is an enlarged, perspective view showing a modification of the spring hooking member of FIG. 4.
Figure 6:
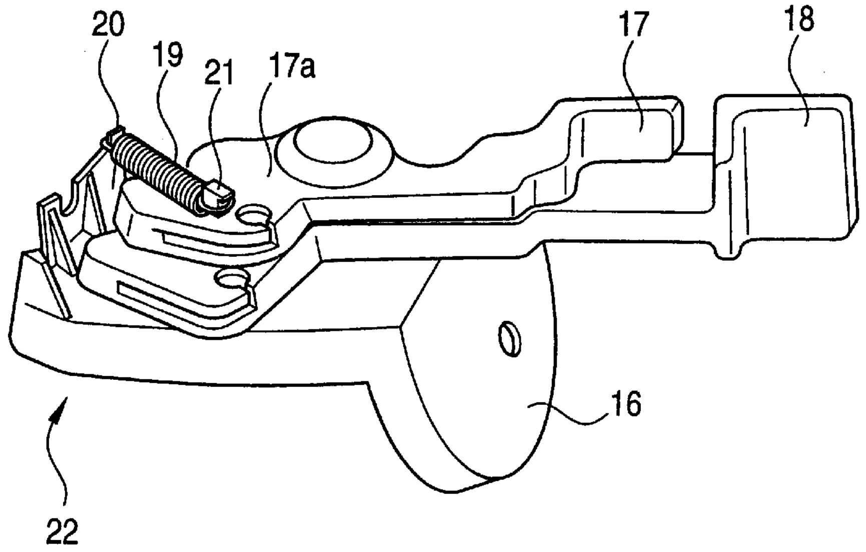
FIG. 6 (PRIOR ART)
FIG. 6 is a perspective view showing a conventional opener device.
Figure 7:
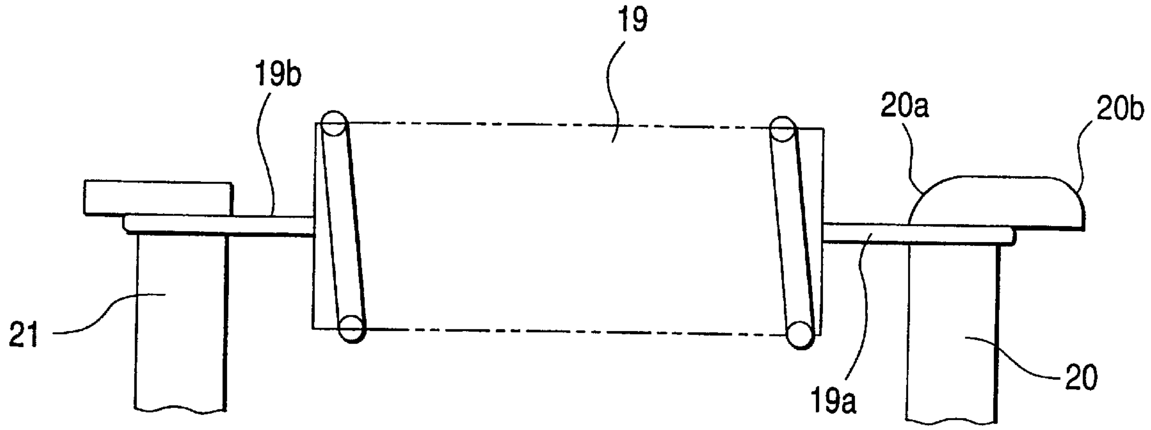
FIG. 7 (PRIOR ART)
FIG. 7 is an enlarged side view showing a spring and pawl portions of the conventional opener device shown in FIG. 6.

Reference is made to FIGS. 2 and 4. A structure of the spring hooking member 12*d* follows. As shown, the recess 13 is formed at the base end of the trunk operation lever 10. The hook-receiving portion 12 is provided in the recess 13, The combination of the hook-receiving portion 12 and the recess 13 form the spring hooking member 10*d*. The hook portion 11*a* of the spring 11 is hooked to the hook-receiving portion 12. In the instant embodiment, the hook-receiving portion 12 has the cutout 14 formed therein. With the cutout 14 the spring 11 is reliably hooked to the hook-receiving portion 12 without being slipped off therefrom. Incidentally, a through hole 15 is formed for molding the trunk operation lever 10 by resin molding, and it is not related to the subject matter of the present invention.

Figure 3:
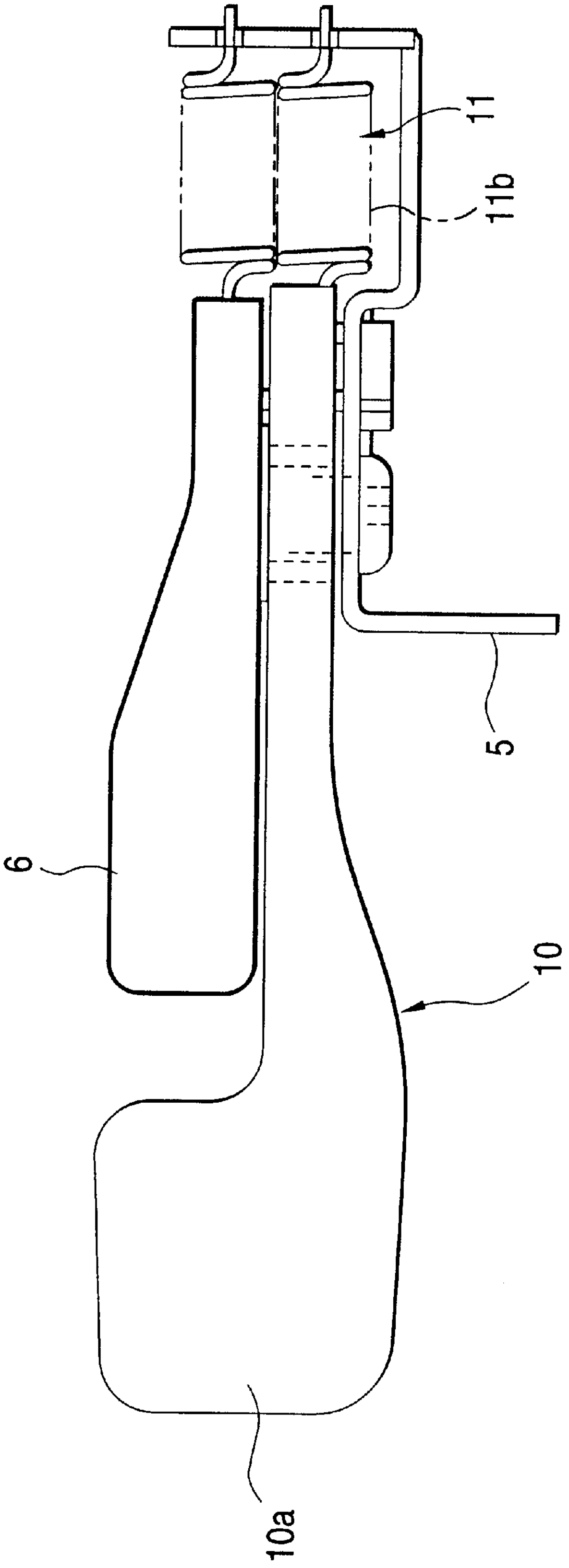
FIG. 3 is a plan view showing the operation levers.

In the opener device thus constructed, the spring hooking member 10*d* comprises the recess 13 located at the base end of the trunk operation lever 10, and the hook-receiving portion 12 is provided in the recess 13, which is located at the internal position in the thickness direction of the trunk operation lever 10. In other words, the hook-receiving portion 12 of the spring hooking member 10*d* is buried in the trunk operation lever 10. Therefore, the hook portion 11*a* of the spring 11 is hooked to the spring hooking member 10*d* without protruding upward from the surface of the trunk operation lever 10. The coiled portion 11*b* of the spring 11 is continuously disposed along the thickness of the trunk operation lever 10 as shown in FIG. 3. In other words, the coiled portion 11*b* of the spring 11 is located at a position so as to be substantially overlapped with the trunk operation lever 10 in the width direction of the thickness at the base end of the trunk operation lever 10. It is most preferable that the center of the coiled portion 11*b* is aligned with the center of the thickness of the trunk operation lever 10. In this case, the overlapped amount of the trunk operation lever 10 with the coiled portion 11*b* is maximized in the direction of the thickness of the trunk operation lever 10 so as to reduce the area occupied by opener device. It is same in the case of the fuel-lid operation lever 6.

Another spring hooking structure is illustrated in FIG. In the figure, reference numeral 10*d*' is a spring hooking member; 13*a* is a recess; and 15*a* is a through-hole. In the spring hooking member 10*d*', as shown, the recesses 13*a* are formed in both sides of the base end of the trunk operation lever 10, respectively. The through-hole 15*a* as a hook-receiving portion is formed through the bottom portion common to those recesses 13*a*. To hook the spring to the spring hooking member 10*d*', the hook portion of the spring is inserted through the through-hole 15*a*.

Also in this embodiment, the hook portion 11*a* of the spring 11 is hooked to the through-hole 15*a* without protruding upward from the surface of the trunk operation lever 10. The coiled portion 11*b* of the spring 11 is continuously disposed along the thickness of the trunk operation lever 10 as similar to the embodiment shown in FIG. 4.

As described above, the opener device of the invention is constructed such that the spring hooking member comprises the recess located at the base end of the operation lever, and the hook-receiving portion is provided in the recess, which is located at an internal position in the thickness direction of the operation lever. In other words, the hook-receiving portion of the spring hooking member is buried in the operation lever. Therefore, the hook portion of the spring is hooked to the spring hooking member without protruding upward from the surface of the operation lever. The coiled portion of the spring is continuously disposed substantially along the thickness of the operation lever. With such a construction, there is no chance that the spring is unintentionally slipped off from the operation lever, and hence the spring is firmly hooked to the operation lever. Further, the operation lever is reduced in thickness, and may easily be manufactured by molding process. Therefore, the opener device is reduced in size as a whole, and the spring after assembled will never be slipped off from the operation lever.

What is claimed is:

1. An opener device for opening a lid member of a vehicle body through a pulling member by a remote operation, comprising:

an operation lever rotatably supported by a part of the vehicle body;

a spring having a coiled portion and first and second hook portions disposed at both ends of said coiled portion; and means for hooking said spring, being disposed at one end of said operation lever, wherein the first hook portion of said spring is hooked to said hooking means and the second hook portion of said spring is hooked to a part of the vehicle body, wherein said hooking means comprises:

a recess formed at the one end of said operation lever, said recess formed as a depression in said operation lever in a thickness direction of said operation lever, wherein said recess is partly surrounded by said operation lever, said recess including a bottom surface substantially perpendicular to the thickness direction of said operation lever; and a hook-receiving portion provided in said recess, said hook-receiving portion formed as a projection extending from said bottom surface of said recess, said hook-receiving portion being located at an internal position in the thickness direction of said operation lever so that said hook-receiving portion does not protrude from a surface of said operation lever, and wherein the first hook portion of said spring is hooked to said hook-receiving portion while being disposed in said recess, so that the coiled portion of said spring is continuously disposed along a thickness of said operation lever.

2. An opener device according to claim 1, wherein said hook-receiving portion of said hooking means is smaller than an inner diameter of the first hook portion of said spring, and said recess is larger than an outer diameter of the first hook portion.

3. An opener device according to claim 2, wherein said hook-receiving portion comprises a protrusion protruded from a bottom portion of said recess and having an L-shaped side view.

4. An opener device according to claim 1, wherein said coiled portion of said spring is located at a position so as to be substantially overlapped with said operation lever in a width direction of a thickness at said one end of said operation lever.

5. An opener device according to claim 1, wherein the hook receiving portion comprises a cut-out portion formed to extend as the through hole through the operation lever to a side of the operation lever opposite to another side of the operation lever on which the hook-receiving portion is formed.

6. An opener device according to claim 3, wherein the hook receiving portion comprises a cut-out portion formed to extend as the through hole through the operation lever to a side of the operation lever opposite to another side of the operation lever on which the hook-receiving portion is formed.

7. The opener device according to claim 1, wherein the bottom surface of said recess includes a through hole.

8. An opener device for opening a lid member of a vehicle body through a pulling member by a remote operation, comprising:

the vehicle body;

an operation lever rotatably supported by a part of the vehicle body;

a spring having a coiled portion and first and second hook portions disposed at both ends of said coiled portion; and a hooking device for hooking said spring, being disposed at one end of said operation lever, wherein the first hook portion of said spring is hooked to said hooking device and the second hook portion of said spring is hooked to a part of the vehicle body, whereby said spring elastically urges said operation lever, wherein said hooking device comprises:

a recess formed in said operation lever at one end of said operation lever, said recess formed as a depression in said operation lever in a thickness direction of said operation lever, wherein said recess is partly surrounded by said operation lever, said recess including a bottom surface substantially perpendicular to the thickness direction of said operation lever; and a hook-receiving portion being provided in said recess, said hook-receiving portion formed as a projection extending from said bottom surface of said recess, said hook-receiving portion being located at an internal position in the thickness direction of said operation lever so that said hook-receiving portion does not protrude from a surface of said operation lever, and wherein the first hook portion of said spring is hooked to said hook-receiving portion while being disposed in said recess, so that the coiled portion of said spring is continuously disposed along a thickness of said operation lever.

9. The opener device according to claim 8, wherein the bottom surface of said recess includes a through hole.

* * * * *